United States Patent [19]

Marquardt

[11] 4,245,076
[45] Jan. 13, 1981

[54] CROSS-LINKABLE VINYL COPOLYMERS CONTAINING HYDROXYL GROUPS

[75] Inventor: Klaus Marquardt, Burghausen, Fed. Rep. of Germany

[73] Assignee: Consortium für Elektrochemische Industrie GmbH, Munich, Fed. Rep. of Germany

[21] Appl. No.: 37,749

[22] Filed: May 10, 1979

[30] Foreign Application Priority Data

May 23, 1978 [DE] Fed. Rep. of Germany ....... 2822436

[51] Int. Cl.³ .................. C08F 214/06; C08F 218/08; C08F 220/26
[52] U.S. Cl. ................................ 526/320; 428/522; 525/329; 526/250; 526/264; 526/296; 526/303; 526/304; 526/314; 526/316; 526/317; 526/318
[58] Field of Search ............... 526/320, 250, 264, 296, 526/303, 304, 314, 316, 317, 318

[56] References Cited

U.S. PATENT DOCUMENTS

| | | | |
|---|---|---|---|
| 2,475,557 | 7/1949 | Swern et al. | 526/292 |
| 3,293,325 | 12/1966 | McEwan | 525/154 |
| 3,966,403 | 6/1976 | Papantoniou et al. | 526/320 |
| 4,018,966 | 4/1977 | Antlfinger et al. | 526/320 |

*Primary Examiner*—Harry Wong, Jr.
*Attorney, Agent, or Firm*—Hammond & Littell, Weissenberger & Muserlian

[57] ABSTRACT

Cross-linkable vinyl ester and/or vinyl halide copolymers containing hydroxyl groups consisting essentially of:

(a) from 50% to 99% by weight of monomer units selected from the group consisting of vinyl esters of alkanoic acids having from 1 to 18 carbon atoms, vinyl halides, and mixtures of said vinyl esters and vinyl halides, (b) from 0 to 40% by weight of mono-olefinically-unsaturated monomer units copolymerizable with vinyl esters and vinyl halide, (c) from 1% to 50% by weight of allyl ester monomer units of the formula:

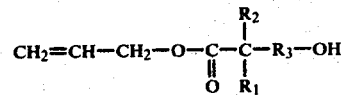

wherein $R_1$ and $R_2$ are selected from the group consisting of hydrogen and alkyl having from 1 to 16 carbon atoms, and $R_3$ is alkylene having from 1 to 16 carbon atoms, with the proviso that the total number of carbon atoms in $R_1$, $R_2$ and $R_3$ is at least 2, where said copolymer has a K-value of between 10 and 100.

8 Claims, No Drawings

CROSS-LINKABLE VINYL COPOLYMERS CONTAINING HYDROXYL GROUPS

BACKGROUND OF THE INVENTION

This invention relates to cross-linkable vinyl ester and/or vinyl halide copolymers containing hydroxyl groups, which copolymers are cross-linkable through the hydroxyl groups.

Copolymers of vinyl esters and/or vinyl halides containing monomer units carrying hydroxyl groups, which may also contain other copolymerizable monomer units, are known. The monomer units carrying hydroxyl groups which are presently available are those which are obtained by saponification of vinyl chloride/vinyl acetate copolymers or which can be obtained by polymerization of hydroxyl group-carrying monomer units. Presently employed as monomer units carrying hydroxyl groups are, for example, monomers, such as hydroxyalkyl vinyl ethers, dihydroxyalkyl maleates and hydroxyalkyl acrylates or methacrylates. The disadvantage of these hydroxyl group-carrying monomers is that on copolymerization an unfavorable distribution of these units in the polymer results so that the cross-linkage with diisocyanates is either incomplete or requires an uneconomically high hydroxyl group concentrations for the cross-linkage.

Allyl esters of hydroxycarboxylic acids, such as allyl glycolate, allyl lactate, have likewise been employed as monomer units containing hydroxyl groups, but these allyl esters of hydroxycarboxylic acid monomers act as regulators or chain transfer agents in the polymerization and, beyond that, reduce the rate of polymerization.

OBJECTS OF THE INVENTION

An object of the invention is to find cross-linkable vinyl ester and/or vinyl halide copolymers containing hydroxyl groups which can be obtained by polymerization without subsequent saponification, whose rate of polymerization is not reduced substantially even by the addition of large amounts (up to 20% by weight) of hydroxyl group-containing monomers, and which yield a K-value (according to Fikentscher, Cellulose Chemie 13 [1932] 58) of at least 45, whereby the hydroxyl group-containing monomers are evenly distributed in the polymer, so that a good cross-linkage of the polymers by diisocyanates is possible.

Another object of the present invention is the production of cross-linkable vinyl ester and/or vinyl halide copolymers containing hydroxyl groups consisting essentially of:

(a) from 50% to 99% by weight of monomer units selected from the group consisting of vinyl esters of alkanoic acids having from 1 to 18 carbon atoms, vinyl halides, and mixtures of said vinyl esters and vinyl halides, (b) from 0 to 40% by weight of mono-olefinically-unsaturated monomer units copolymerizable with vinyl esters and vinyl halide, (c) from 1% to 50% by weight of allyl ester monomer units of the formula:

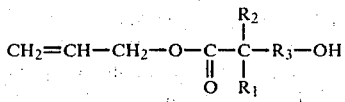

wherein $R_1$ and $R_2$ are selected from the group consisting of hydrogen and alkyl having from 1 to 16 carbon atoms, and $R_3$ is alkylene having from 1 to 16 carbon atoms, with the proviso that the total number of carbon atoms in $R_1$, $R_2$ and $R_3$ is at least 2, where said copolymer has a K-value of between 10 and 100.

The subject of the present invention is cross-linkable copolymers which are obtained by polymerization from vinyl esters and/or vinyl halides and hydroxyl group-containing monomer units and, if necessary, one or several monoolefinically-unsaturated monomers copolymerizable with vinyl ester and/or vinyl halides from the group of ethylene, propylene, acrylic and methacrylic acid, and their esters with alkanols having from 1 to 8 carbon atoms, or their amides or acrylonitrile or methacrylonitrile, characterized in that the copolymer contains:

(a) 50% to 99% by weight of vinyl esters and/or vinyl halide monomer units, (b) up to 40% by weight copolymerizable monomers from the group of ethylene, propylene, acrylic and methacrylic acid, and their esters with alkanols having from 1 to 8 carbon atoms, acrylamide and methacrylamide, acrylonitrile and methacrylonitrile, and (c) 1% to 50% by weight of hydroxyl group-containing allyl esters of the general formula:

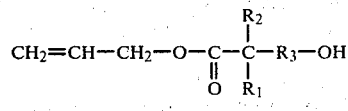

where $R_1$ and $R_2$ denote hydrogen atoms or identical or different aliphatic hydrocarbon radicals, preferably hydrogen atoms or methyl groups, and $R_3$ is a hydrocarbon radical, preferably an alkylene, where the number of the carbon atoms of groups $R_1$, $R_2$ and $R_3$ is between 1 and 16, and the total number of the carbon atoms in $R_1$, $R_2$ and $R_3$ is at least 2, where the copolymers have a K-value of between 10 and 100.

DETAILED DESCRIPTION OF THE INVENTION

The present invention relates more particularly to cross-linkable vinyl ester and/or vinyl halide copolymers containing hydroxyl groups consisting essentially of:

(a) from 50% to 99% by weight of monomer units selected from the group consisting of vinyl esters of alkanoic acids having from 1 to 18 carbon atoms, vinyl halides, and mixtures of said vinyl esters and vinyl halides, (b) from 0 to 40% by weight of mono-olefinically-unsaturated monomer units copolymerizable with vinyl esters and vinyl halide, (c) from 1% to 50% by weight of allyl ester monomer units of the formula:

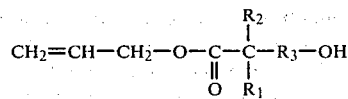

wherein $R_1$ and $R_2$ are selected from the group consisting of hydrogen and alkyl having from 1 to 16 carbon atoms, and $R_3$ is alkylene having from 1 to 16 carbon atoms, with the proviso that the total number of carbon atoms in $R_1$, $R_2$ and $R_3$ is at least 2.
where said copolymer has a K-value of between 10 and 100.

A special embodiment of the copolymers consists in that vinyl acetate is used as a vinyl ester, and vinyl chloride is employed as a vinyl halide. In some cases it seems of advantage to select the monomers ethylene and butyl acrylate from group (b). Frequently, the cross-linkable copolymers are produced with 2.5 to 5 mol percent of hydroxyl group-containing allyl esters.

Another subject of the invention concerns the preparation of the copolymers. The polymerization can be effected in mass, in aqueous dispersion or in solution with the addition of conventional polymerization aids and free-radical-forming catalysts, if necessary, under an ethylene or propylene pressure of between 2 and 80 bar in the autoclave under stirring at temperatures between 20° C. and 90° C. It is of particular advantage if the hydroxyl group-containing allyl ester components are charged together with the remaining monomers.

Another subject of the invention concerns the use of the polymers in cross-linkable coating compounds, adhesives, as binders for textile products, and for the production of sealing compounds or molded parts.

The polymers according to the invention are not only easy to produce, and can be cross-linked easily and completely with diisocyanates, they also have the property that the glass transition temperature is reduced, with reference to other vinyl esters and/or vinyl halide copolymers.

The copolymers according to the invention consist of 50% to 99% by weight, preferably 80% to 97% by weight, of vinyl ester and/or vinyl halide units, though mixtures of different vinyl esters or vinyl halides can also be used. The vinyl esters are those of the alkanoic acids with 1 to 18 carbon atoms, preferably 2 to 12 carbon atoms, such as vinyl laurate and particularly vinyl acetate. The vinyl halides are vinyl fluoride, vinyl bromide, and preferably vinyl chloride.

Naturally one or more mono-ethylenically-unsaturated monomers can also be used in the copolymerization in addition to the vinyl esters and/or vinyl halides. These monomers are, for example, the lower alkenes, such as ethylene, propylene; vinyl benzene and substituted vinyl benzene, such as styrene and substituted styrenes; N-vinyl pyrrolidone; alkenoic acids having from 3 to 7 carbon atoms, such as crotonic acid, acrylic acid or methacrylic acid and their derivatives, such as their lower alkyl esters and their amides; acrylonitrile; methacrylonitrile; disubstituted ethylenes, such as vinylidene chloride, vinylene carbonate; vinyl ethers with alkanols having 1 to 18 carbon atoms; vinyl ketones; mono-olefinically-unsaturated dicarboxylic acids or alkenedioic acids having from 4 to 8 carbon atoms, such as maleic acid, fumaric acid and itaconic acid and their derivatives, such as half esters and esters with alkanols having from 1 to 18 carbon atoms, their half amides, amides and salts. All monomers copolymerizable with vinyl esters and/or vinyl halides are suitable. The above-mentioned groups and compounds are only mentioned as examples of monomers which are also suitable for the purposes of the invention.

Particularly suitable as copolymerizable monomers are ethylene, acrylic acid and methacrylic acid, as well as their esters with alkyl radicals with up to 8 carbon atoms or their amides, acrylonitrile and methacrylonitrile. These copolymerizable monomers can be contained in amounts of up to 40% by weight, preferably 0 to 20% by weight, in the copolymers of the invention, provided the portion by weight of these other monomer units is less than the portion by weight of the sum of the vinyl ester and/or vinyl halide units.

The hydroxyl group-containing allyl esters are those of the general formula:

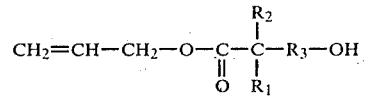

where $R_1$ and $R_2$ denote hydrogen atoms or identical or different aliphatic hydrocarbons, such as alkyls having from 1 to 16 carbon atoms, preferably hydrogen atoms or methyl groups, and $R_3$ is a hydrocarbon radical, preferably an alkylene having from 1 to 16 carbon atoms, where the number of the carbon atoms of the groups $R_1$, $R_2$ and $R_3$ is between 1 and 16 and the total number of the carbon atoms of $R_1$, $R_2$ and $R_3$ is at least 2, $R_3$ is preferably a straight-chained alkylene group. The OH group can be primary, secondary or tertiary, preferably those hydroxyl group-containing allyl esters are used whose hydroxyl group is primary, that is, a terminal hydroxyl group.

These monomer units can be polymerized in amounts of 1% to 50% by weight, preferably 2% to 20% by weight, particularly 2.5% to 5% by weight, based on the total monomer unit content. Examples of the hydroxyl group-containing esters according to the invention are the allyl esters of 5-hydroxyvaleric acid, 6-hydroxycaproic acid, 11-hydroxyundecanoic acid and 12-hydroxystearic acid.

The hydroxyl group-containing allyl esters show surprising copolymerization properties in the copolymerization to the copolymers according to the invention. Unlike conventional allyl esters, they neither influence substantially the rate of polymerization nor do they substantially reduce the K-value of the resulting polymers. The K-value of the polymers is over 45, even in the presence of 20% by weight, for example, of the new allyl esters in the copolymer, but it can be reduced in known manner during the polymerization, if necessary, by the addition of known molecular weight regulators.

The copolymers according to the invention can be produced according to any known polymerization method by using free-radical-forming catalysts. Such polymerization methods as substance/mass polymerization, emulsion polymerization, or polymerization in dispersion, both in the aqueous and in the non-aqueous phase, as well as by solution polymerization or, optionally, precipitation polymerization, can be employed. Based on the special behavior of the new hydroxyl group-containing allyl esters, it is possible to add the hydroxyl group-containing allyl esters already at the start of the polymerization, since no irregular distribution of the hydroxyl groups in the copolymer molecule occurs.

If the copolymers according to the invention are to be cross-linked, this can be done according to the known method for cross-linking hydroxyl group-containing polymers. Preferably this is by reaction with aliphatic or aromatic diisocyanates or polyisocyanates or blocked diisocyanates, such as hexamethylene diisocyanate, toluylene-diisocyanate, trimerized hexamethylene diisocyanate, or caprolactam blocked isophorone diisocyanate.

Other examples for cross-linking methods are the reaction with melamine/formaldehyde condensates, such as hexamethoxymethyl melamine; with dimethylol urea; with epoxy resin-precondensates; and with polycarboxylic acids or acid anhydrides. In all cases condensation catalysts can be added, if necessary, and elevated temperatures and/or pressure can be applied.

The hydroxyl group-containing copolymers according to the invention are used as hardenable coating compounds or adhesives, as binders for textile products, and for the production of sealing compounds or the manufacture of molded parts.

The following examples illustrate the invention without being limitative.

EXAMPLES

A. Preparation of the hitherto unknown hydroxycarboxylates (1) 6-Hydroxycaproic acid allyl ester or allyl 6-hydroxy caproate 684.6 gm of ε-caprolactone and 2440 gm of allyl alcohol were boiled for 60 minutes under reflux, adding 1 gm of concentrated sulfuric acid. Then the mixture was neutralized with 1.5 gm of CaCO₃, and the allyl alcohol was distilled off to a great extent in a rotation evaporator. During the following vacuum distillation, the allyl 6-hydroxycaproate passes over at 105° C. to 110° C. at 1 mm Hg. The yield is 650 gm or 63% of the theory, related to the ε-caprolactone. Polyesters of hydroxycaproic acid remained as a residue.

(2) 11-Hydroxyundecanoic acid allyl ester or allyl 11-hydroxyundecanoate 250 gm of 11-bromoundecanoic acid were saponified with 114 gm of KOH, dissolved in 350 ml of methanol and 50 ml of water, at 55° C. to 65° C. for 20 hours. After filtering off the separated KBr, the solution was boiled down to a great extent and acidified with diluted aqueous HCl to a pH of 2. The 11-hydroxyundecanoic acid separated and the mother liquor was extracted with methylene chloride. After evaporating the solvent, the 11-hydroxyundecanoic acid was boiled with 250 ml of allyl alcohol and 0.5 gm of p-toluene sulfonic acid for 20 hours under reflux. The water of reaction was distilled off continuously with allyl alcohol as an azeotrope and the allyl alcohol was replenished from time to time by a fresh supply. After neutralization with Na₂CO₃, the excess allyl alcohol was evaporated and the remaining residue was distilled under vacuum. At 138° C. to 144° C. and 1 mm Hg, 101 gm of 11-hydroxyundecanoic acid allyl ester passed over, which corresponds to a yield of 50%, related to the starting 11-bromoundecanoic acid.

(3) 12-Hydroxystearic acid allyl ester or allyl 12-hydroxystearate

In analogy to A(2), 200 gm of 12-hydroxystearic acid were esterified with 300 ml of allyl alcohol. The 12-hydroxystearic acid allyl ester was obtained in a yield of 78%, and was distilled over in the high-vacuum at about 160° C. to 180° C.

(4) 5-Hydroxyvaleric acid allyl ester or allyl 5-hydroxyvalerate 50 gm of δ-valerolactone and 290 gm of allyl alcohol are boiled for two hours under reflux after adding 0.25 ml of concentrated sulfuric acid. Then the solution was neutralized with 10 gm of NaHCO₃ to a pH of 7. The allyl alcohol was distilled off and the residue was fractioned under vacuum. At 94° C. and 0.8 Torr, 32 gm of allyl 5-hydroxyvalerate pass over, which corresponds to a yield of 40.5% of the theory.

The substances A(1) to A(4) were identified by their nuclear magnetic resonance spectra.

B. Comparison Tests (1) Copolymerization of vinyl acetate with allyl glycolate in solution 217 gm of vinyl acetate and 33 gm of allyl glycolate were mixed, in a one-liter round flask with blade stirrer and reflux condenser, with 250 gm of ethyl acetate. The mixture was polymerized at 72° C. to 74° C. after adding 0.84 gm of tert. butyl perpivalate. After six hours, a reaction of 76.4% has been achieved, calculated from the solid content of the solution, and an additional 0.24 gm of initiator are added, which increases the reaction degree after a further 7.5 hours to 84.4%. A further addition of 0.12 gm of initiator yields after a further 8.5 hours, a final reaction degree of 95%. The total reaction time was 22 hours.

The K-value of the copolymer, measured according to DIN 53 726 in a mixture of 95% tetrahydrofuran and 5% water, was 39.4.

(2) Terpolymerization of vinyl acetate, vinyl laurate and allyl glycolate in solution 200 gm of vinyl acetate, 23 gm of vinyl laurate, 15 gm of allyl glycolate and 442 gm of ethyl acetate were mixed and the monomers were polymerized at 72° C. to 74° C. after adding 1.5 gm of benzoyl peroxide under the conditions as in B(1). After seven hours, a reaction degree of 68% was attained. A further addition of 1.5 gm of initiator no longer increased the reaction within the next 17 hours.

The K-value of the copolymer, measured as in B(1) was 21.1.

(3) Copolymerization of vinyl acetate with allyl lactate in solution 231.6 gm of vinyl acetate, 18.4 gm of allyl lactate and 250 gm of ethyl acetate were mixed and the monomers were polymerized as in B(1) at 72° C. to 74° C. The amounts of tert. butyl perpivalate employed and the reaction achieved is given in the following Table I.

TABLE I

| Time (hrs) | Initiator (gm) | Degree of Reaction % |
|---|---|---|
| 0 | 0.85 | 0 |
| 2.5 | 0.375 | 26 |
| 5.5 | 0.375 | 42 |
| 8.0 | 1.5 | — |
| 10.0 | — | 70 |
| 12.0 | 0.75 | 78 |
| 16.0 | — | 84 |

The K-value of the product, measured as in B(1) was 28.

(4) Copolymerization of vinyl chloride with allyl lactate in suspension 1.55 gm of methyl cellulose (Methocell HG 90-Dow Chemical) in 500 gm of water were charged in a one-liter autoclave with stirrer. The autoclave was evacuated and a mixture of 284.6 gm of vinyl chloride, 15.4 gm of allyl lactate and 0.75 gm of cyclohexyl peroxydicarbonate was charged in. The polymerization was effected for seven hours at 60° C. and for one hour at 70° C. The autoclave was then vented and the suspension polymer was filtered off. After washing with methanol and drying, the polymer was weighed. The degree of reaction was 66.6%.

The K-value of the copolymer in cyclohexanone was 53.

(5) Copolymerization of vinyl acetate and hydroxypropyl methacrylate

As in B(1), 230 gm of vinyl acetate, 20 gm of hydroxypropyl methacrylate, and 250 gm of ethyl acetate were mixed and the monomers were polymerized with addition of 1.2 gm of tert. butyl perpivalate. After a long induction period, a vigorous polymerization set in, which lead within five hours to a complete reaction.

The K-value of the copolymer, measured as in B(1) was 35.

(6) Copolymerization of vinyl acetate and hydroxypropyl acrylate

As in B(1), 231.g gm of vinyl acetate, 18.4 gm of hydroxypropyl acrylate, and 250 gm of ethyl acetate were mixed and the monomers were polymerized with addition of 0.75 gm of tert. butyl perpivalate.

After two hours, a reaction of 100% had already been achieved. The copolymer formed had a K-value [in analogy to B(1)] of 46.

C. Examples illustrating the invention

(1) Copolymerization of vinyl acetate with 6-hydroxycaproic acid allyl ester As in B(1), 204.5 gm of vinyl acetate, 45.5 gm of 6-hydroxycaproic acid allyl ester, and 250 gm of ethyl acetate were mixed and the monomers were polymerized after adding 1.2 gm of tert. butyl perpivalate. After seven hours a reaction degree of 98% was achieved.

The K-value of the copolymer was 53.

(2) Terpolymerization of vinyl acetate, vinyl laurate and 6-hydroxy caproic acid allyl ester in solution As in B(2), 200 gm of vinyl acetate, 23 gm of vinyl laurate, and 22 gm of 6-hydroxycaproic acid allyl ester in 250 gm of ethyl acetate were mixed and the monomers were polymerized after adding 1.5 gm of benzoyl peroxide. After eight hours a reaction degree of 92% had been achieved.

The K-value of the copolymer, measured as in B(1) was 45.4.

(3) Polymerization of vinyl acetate, vinyl laurate, butyl acrylate and 6-hydroxycaproic acid allyl ester in aqueous emulsion 107 gm of water, 20 gm of Aerosol A-102 (American Cyanamid), (Disodium ethoxylated alcohol half ester of sulfosuccimic acid) and 15 gm of methanol were charged in a two-liter round flask with an anchor stirrer, and heated to 50° C. In a separate vessel, the monomers vinyl acetate (360 gm), vinyl laurate (120 gm), butyl acrylate (120 gm), and 6-hydroxycaproic acid allyl ester (41 gm) were emulsified in a solution of 20 gm of Aerosol A-120, 15 gm of methanol, 6 gm of acrylic acid, and 0.7 gm of $NaHCO_3$ in 300 gm of water and stirred constantly. In other vessels, 6.6 gm of ammonium persulfate were dissolved in 36 ml of water, and 3.3 gm of Rongalite were dissolved in 36 ml of water. The monomer emulsion, the persulfate solution and the Rongalite solution were then uniformly dosed within three hours into the polymerization vessel through a triple dosing pump. After 3.5 hours of polymerization at 50° C., a solid content of 53.5% has been obtained. The copolymer dispersion had a viscosity of 2100 cP (Brookfield LVT - viscosimeter) and yields after spreading and drying a completely clear soft-elastic copolymer film.

(4) Terpolymerization of vinyl chloride, vinyl acetate and 6-hydroxycaproic acid allyl ester in solution 300 gm of ethyl acetate, 36.75 gm of vinyl acetate and 36.75 gm of 6-hydroxycaproic acid allyl ester, as well as 1.9 gm of tert. butyl perpivalate were charged in a one-liter autoclave. The autoclave was flushed with nitrogen and evacuated. Subsequently, the mixture was heated to 60° C. 226.5 gm of vinyl chloride were pressed in. Then the mixture was polymerized for seven hours while stirring.

The K-value of the solution polymer, measured in cyclohexanone, was 45. The vinyl chloride content was determined to be 77%.

(5) Copolymerization of vinyl chloride and 6-hydroxycaproic acid allyl ester in suspension 25 gm of methyl cellulose (Methocell HG 90) dissolved in 8 liters of water, 10 gm of dicyclohexyl peroxydicarbonate, and 512 gm of 6-hydroxycaproic acid allyl ester were charged in a 16-liter autoclave which was flushed with nitrogen and evacuated. Then 3488 gm of vinyl chloride were pressed in. The mixture was heated to 60° C. and polymerized for seven hours while stirring. After expansion of the pressure and vacuum evacuation, the mixture was cooled. The copolymer was filtered off and washed with 5 liters of methanol. The reaction degree was 87.5%. The copolymer has a K-value, measured in cyclohexanone, of 56.8, and contains 85% vinyl chloride.

(6) to (10) Copolymerization of vinyl acetate with different hydroxycarboxylic acid allyl esters in solution The vinyl acetate and allyl ester, in the amounts indicated in the following Table II, were polymerized as in B(1) in 250 ml of ethyl acetate after adding 1.1 gm of tert. butyl perpivalate, and the K-value of the copolymer as measured in tetrahydrofuran/water is also given.

TABLE II

| Example No. | Vinyl Acetate (gm) | Hydroxy-carboxylic Acid Allyl Ester | Amount of Esters (gm) | Time to 100% Reaction Degree (hrs) | K-Value |
|---|---|---|---|---|---|
| C 6 | 225 | 6-hydroxycaproic acid allyl ester | 25 | 3.5 | 62 |
| C 7 | 228 | 5-hydroxyvaleric acid allyl ester | 22 | 3.0 | 52 |
| C 8 | 240 | 6-hydroxycaproic acid allyl ester | 10 | 3.0 | 54 |

TABLE II-continued

| Example No. | Vinyl Acetate (gm) | Hydroxy-carboxylic Acid Allyl Ester | Amount of Esters (gm) | Time to 100% Reaction Degree (hrs) | K-Value |
|---|---|---|---|---|---|
| C 9 | 225 | 11-hydroxyundecanoic acid allyl ester | 25 | 5.0 | 52 |
| C 10 | 213 | 12-hydroxystearic acid allyl ester | 37 | 3.0 | 47 |

D. Cross-linkage of copolymers (1) Cross-linkage with isocyanates 50 gm of the 50% copolymer solution to be cross-linked were mixed with an equivalent amount of diisocyanate to give a hydroxyl to isocyanate ratio of 1 (OH:NCO=1:1) and 2 drops of dibutyl tin dilaurate, and poured as a film of 0.8 mm thickness on a Teflon plate. After evaporation of the solvent, the film was lifted from the substrate and dried for several hours in a vacuum-drying cabinet at 60° C.

(2) Cross-linkage with hexamethoxymethyl melamine (HMMM)

50 gm of the solution or dispersion to be cross-linked were mixed with 5 gm of HMMM ("Cymel 300", Cyanamid International) (in dispersions by using water/isopropanol as a solvent) and poured as a film of 0.8 mm thickness on a Teflon plate. After drying the film was cross-linked for 10 minutes at 160° C.

(3) Analysis of cross-linkage 500 mg of the cross-linked product were boiled in 100 ml of ethyl acetate for six hours. Then any ethyl acetate that had evaporated was replenished. The ethyl acetate solution was filtered to separate the insoluble portion, or centrifuged, and the soluble portion of the copolymer was determined by evaporating an aliquot portion of the solution. In the case of copolymers containing vinyl chloride, 1,2-dichloroethane was employed instead of ethyl acetate. The following Table III gives the results.

TABLE III

| Example No. | Monomers[1]* | Hydroxyl Groups Mol % | Cross-linking Agent[2]** | % Insoluble Portion |
|---|---|---|---|---|
| B 5 | VAc/HPMA | 5 | TDI | 32 |
| B 6 | VAc/HPA | 5 | TDI | 25 |
| C 1 | VAc/HCAE | 10 | TDI | 98 |
| C 3 | VAc/BA/VL/HCAE | 4 | HMMM | 96 |
| C 4 | VC/VAc/HCAE | 5 | TDI | 91 |
| C 5 | VC/HCAE | 5 | TDI | 97 |
|  |  |  | HMMM | 94 |
| C 7 | VAc/HVAE | 5 | IPDI | 97 |
|  |  |  | HMDI | 97 |
| C 8 | VAc/HCAE | 2 | TDI | 88 |
| C 9 | VAc/HUAE | 3.8 | TDI | 89 |
| C 10 | VAc/HSAE | 4.3 | TDI | 92 |

[1]* VAc = vinyl acetate
VL = vinyl lurate
VC = vinyl chloride
BA = butyl acrylate
HPMA = hydroxypropyl methacrylate
HPA = hydrocypropyl acrylate
HVAE = hydroxyvaleric acid allyl ester
HCAE = hydroxycaproic acid allyl ester
HUAE = hydroxyundecanoic acid allyl ester
HSAE = hydroxystearic acid allyl ester
[2]** TDI = toluylene diisocyanate
IPDI = isophorone diisocyanate
HMDI = hexamethylene diisocyanate
HMMM = hexamethoxymethyl melamine E. Glass transition temperature of the copolymers As a measure of the plasticizing effect of the hydroxyl group-containing monomers in the copolymers, according to the invention, the glass transition temperature of the copolymers produced with them was determined. The glass transition temperatures were determined by means of differential thermoanalysis and reported in Table IV.

TABLE IV

| Example | Monomer | % By Weight of Allyl Ester | Glass Transition Temperature (°C.) |
|---|---|---|---|
| C 5 | VC/HCAE | 15 | 44 |
| C 6 | VAc/HCAE | 10 | 14 |
| C 9 | VAc/HUAE | 10 | 8 |
| C 10 | VAc/HSAE | 10 | 23 |
| For Comparison:* |  |  |  |
|  | Polyvinyl acetate |  | 32 |
|  | Polyvinyl chloride |  | 81 |

*(Polymer Handbook, 2nd Ed., Editors: J. Brandrup and E. H. Immergut, Published by J. Wiley & Sons, New York, 1975)

The preceding specific embodiments are illustrative of the practice of the invention. It is to be understood, however, that other expedients known to those skilled in the art or disclosed herein, may be employed without departing from the spirit of the invention or the scope of the appended claims.

I claim:

1. Cross-linkable vinyl ester and/or vinyl halide copolymers containing hydroxyl groups consisting essentially of:
   (a) from 50% to 99% by weight of monomer units selected from the group consisting of vinyl esters of alkanoic acids having from 1 to 18 carbon atoms, vinyl halides, and mixtures of said vinyl esters and vinyl halides,
   (b) from 0 to 40% by weight of mono-olefinically-unsaturated monomer units copolymerizable with vinyl esters and vinyl halide,
   (c) from 1% to 50% by weight of allyl ester monomer units of the formula:

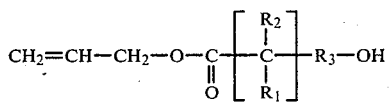

wherein $R_3$ is alkylene having from 4 to 10 carbon atoms, and the OH is a terminal OH,
where said copolymer has a K-value of between 45 and 100.

2. The cross-linkable vinyl ester and/or vinyl halide copolymer containing hydroxyl groups of claim 1, wherein said mono-olefinically-unsaturated monomer units of component (b) are selected from the group consisting of lower alkenes, N-vinyl pyrrolidone, alkenoic acids having from 3 to 7 carbon atoms, their lower alkyl esters and their amides, (meth)acrylonitrile, vinylidene chloride, alkenedioic acids having from 4 to 8 carbon atoms, their half esters and esters with alkanols having from 1 to 18 carbon atoms and their half amides and amides.

3. The cross-linkable vinyl ester and/or vinyl halide copolymer containing hydroxyl groups of claim 1, wherein said mono-olefinically-unsaturated monomer units of component (b) are selected from the group consisting of ethylene, (meth)acrylic acid, their alkyl esters having from 1 to 8 carbon atoms in the alkyl, their amides, and (meth)acrylonitrile.

4. The cross-linkable vinyl ester and/or vinyl halide copolymer containing hydroxyl groups of claim 1, wherein said mono-olefinically-unsaturated monomer units of component (b) are selected from the group consisting of ethylene and butyl acrylate.

5. The cross-linkable vinyl ester and/or vinyl halide copolymer containing hydroxyl groups of claim 1, wherein said monomers of component (a) are selected from the group consisting of vinyl acetate, vinyl chloride and mixtures of vinyl acetate and vinyl chloride.

6. The cross-linkable vinyl ester and/or vinyl halide copolymer containing hydroxyl groups of claim 1, wherein said copolymer containing hydroxyl groups contains from 2.5 to 5 mol percent of said allyl ester monomer units of component (c).

7. The cross-linkable vinyl ester acid/or vinyl halide copolymer containing hydroxyl groups of claim 1, wherein said allyl ester monomer of component (c) is 6-hydroxycaproic acid allyl ester.

8. Cross-linkable vinyl ester and/or vinyl halide copolymers containing hydroxyl groups consisting essentially of:
from 50% to 99% by weight of monomer units selected from the group consisting of vinyl esters of alkanoic acids having from 1 to 18 carbon atoms, vinyl halides, and mixtures of said vinyl esters and vinyl halides, and
from 1 to 50% by weight of allyl ester monomer units of the formula:

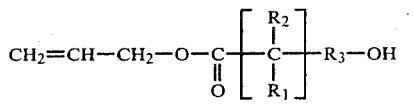

wherein $R_3$ is alkylene having from 4 to 10 carbon atoms, and the OH is a terminal OH,
where said copolymer has a K-value of between 45 and 100.

* * * * *

UNITED STATES PATENT AND TRADEMARK OFFICE
CERTIFICATE OF CORRECTION

PATENT NO. : 4,245,076
DATED : January 13, 1981
INVENTOR(S) : Klaus Marquardt

It is certified that error appears in the above—identified patent and that said Letters Patent are hereby corrected as shown below:

Column 10, Claim 1, Lines 52 to 58, the formula should read as follows:

$$CH_2=CH-CH_2-O-\underset{\underset{O}{\|}}{C}-R_3-OH$$

Column 12, Claim 8, Lines 17 to 23, the formula should read as follows:

$$CH_2=CH-CH_2-O-\underset{\underset{O}{\|}}{C}-R_3-OH$$

Signed and Sealed this

Twentieth Day of April 1982

[SEAL]

Attest:

GERALD J. MOSSINGHOFF

Attesting Officer     Commissioner of Patents and Trademarks